(12) United States Patent
James et al.

(10) Patent No.: US 6,791,910 B1
(45) Date of Patent: Sep. 14, 2004

(54) LIBRARY CONTROLLER HAVING STORED TABLE INDICATING ATTRIBUTES OF AN AUTOMATED DATA STORAGE LIBRARY WITH RESPECT TO MEDIA

(75) Inventors: Kimberly Kay James, Tucson, AZ (US); Raymond Anthony James, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/439,289

(22) Filed: Nov. 15, 1999

Related U.S. Application Data

(62) Division of application No. 09/127,967, filed on Aug. 3, 1998, now Pat. No. 6,031,798.

(51) Int. Cl.$^7$ .............................................. G11B 21/08
(52) U.S. Cl. ..................... 369/30.28; 700/214; 711/111
(58) Field of Search .............................. 369/34, 30, 36, 369/37, 38, 39, 178, 30.28, 30.27, 30.29, 30.3, 30.31, 30.32, 30.34, 30.35; 700/214; 711/111

(56) References Cited

U.S. PATENT DOCUMENTS

| | | | |
|---|---|---|---|
| 7,987,533 | | 1/1991 | Clark et al. ................... 369/36 |
| 5,164,909 A | * | 11/1992 | Leonhardt et al. ............ 369/34 |
| 5,325,523 A | | 6/1994 | Beglin et al. ............... 395/600 |
| 5,349,659 A | | 9/1994 | Do et al. .................... 395/700 |
| 5,416,914 A | * | 5/1995 | Korngiebel et al. .......... 369/34 |
| 5,418,971 A | | 5/1995 | Carlson ....................... 710/24 |
| 5,423,018 A | | 6/1995 | Dang et al. ................. 395/425 |
| 5,459,848 A | | 10/1995 | Mase .......................... 369/34 |
| 5,469,560 A | | 11/1995 | Beglin ........................ 711/112 |
| 5,513,156 A | | 4/1996 | Hanaoka et al. .............. 369/34 |
| 5,522,090 A | | 5/1996 | Tanaka et al. .............. 395/894 |
| 5,546,575 A | | 8/1996 | Potter et al. ................ 395/600 |
| 5,640,510 A | | 6/1997 | Hanaoka et al. .............. 369/34 |
| 5,729,464 A | | 3/1998 | Dimitri ....................... 369/34 |
| 5,751,672 A | * | 5/1998 | Yankowski ................... 369/30 |
| 5,768,141 A | | 6/1998 | Hanaoka et al. .............. 369/34 |

* cited by examiner

*Primary Examiner*—Tan Dinh
(74) *Attorney, Agent, or Firm*—John H. Holcombe; Robert M. Sullivan; Dale M. Crockatt

(57) ABSTRACT

Disclosed is an automated data storage library for storing and retrieving data storage media in a plurality of storage slots, for a host processor. At least one drive unit is coupled to the host processor for reading and/or writing data on the data storage media. A library manager includes a stored table for identifying the data storage media stored in the storage slots, the stored table indicating artificial scaling of the data storage capacity of selected data storage media to selected values less than the actual data storage capacity thereof. The stored table also stores indicators of attributes of the library with respect to ones of the data storage media, such as indicating that the drive unit is to communicate at the drive/host interface in a specific protocol. The library manager responds to a retrieve signal from the host processor, transporting the selected data storage media to a drive unit, and signaling the drive unit to artificially scale the data storage capacity of the selected data storage media to the selected value therefor identified in the stored table, and/or signaling the drive unit to communicate at the drive/host interface in the protocol of the attributes of the selected data storage media.

5 Claims, 4 Drawing Sheets

| VOLSER | CAT | CELLXY | HOMEXY | MOUNTS | MED.TYP. | INDICAT. | CARTSIZE | INTFTYPE |
|---|---|---|---|---|---|---|---|---|
| KIM001 | FF00 | 1234 | 3211 | 3 | 4 | 23 | 5 | 3490 |
| KIM002 | FF00 | 1235 | 1112 | 66 | 4 | 23 | 10 | 3590 |
| KIM003 | 1111 | 1236 | | | 4 | | 10 | 3490 |
| RAY997 | 1111 | 1237 | | | 4 | | 10 | 3590 |
| RAY998 | 1231 | 1238 | | | 4 | | 5 | 3590 |
| RAY999 | 5511 | 1239 | | | 4 | | 1 | 3590 |

LIBRARY CONTROLLER HAVING STORED TABLE INDICATING ATTRIBUTES OF AN AUTOMATED DATA STORAGE LIBRARY WITH RESPECT TO MEDIA

This is a divisional application of Ser. No. 09/127,967, filed Aug. 3, 1998, now is U.S. Pat. No. 6,031,798.

DOCUMENTS INCORPORATED BY REFERENCE

Commonly assigned U.S. patent application Ser. No. 08/899,042, filed Jul. 23, 1997, "Tape Pre-formatting with Uniform Data Storage Segments Selectively Mapped to Fixed or Variable Sized Independently Addressable Data Storage Partitions", Basham et al., is incorporated for its showing of a data storage drive and method for formatting data storage cartridges to various capacities, called flexible capacity scaling.

Commonly assigned U.S. Pat. No. 5,546,557, "System for Storing and Managing Plural Logical Volumes in Each of Several Physical Volumes Including Automatically Creating Logical Volumes in Peripheral Data Storage Subsystem", Allen et al., is incorporated for its showing of a system for storing and managing plural logical volumes in each of several physical media volumes in an automated data storage library.

TECHNICAL FIELD

This invention relates to automated data storage libraries for storing and retrieving data storage media, and, more particularly, to the capacity scaling of such media and to the attributes of the library components.

BACKGROUND OF THE INVENTION

Automated data storage libraries are known for providing cost effective access to large quantities of stored data. In an automated data storage library, numerous storage slots, or cells, are arrayed within the library and are used to hold data storage media, such as magnetic tape cartridges or cassettes. (The term "media" used herein refers to any portable housing structure containing any type of data storage media.)

In a conventional automated data storage library, the storage slots are arranged in a planar or cylindrical orthogonal arrangement of rows and columns, forming a "wall" of storage slots for holding data storage media. An accessor, furnished with one or more pickers, is a robotic device which moves along a guideway in a horizontal motion, or about a pivot in a rotary motion, and moves vertically to access the various storage slots with the picker, and transports selected data storage media amongst the storage slots and one or more drive units, which read and/or write data on the data storage media. To double the storage capacity, two "walls" of storage slots may be provided on either side of the accessor.

Libraries also typically contain input/output stations or ports through which an operator may pass data storage media to be added to the library and through which the accessor may pass data storage media to be removed from the library.

The operation of the accessor is typically under the direct control of a library manager, which is a programmed data processing controller typically situated in the library. A library manager typically comprises a micro-processor, including a database such as memory or a disk drive, and input/output adapters, such as SCSI ports. The disk drive typically stores the programs (microcode) which cause the manager to operate the library, and which include information indicating the characteristics of the particular library. The programs for the library manager may be installed or updated by a typical input device, such as a CD-ROM optical drive. The library manager is interconnected with one or more host computer systems, such as a mainframe or network computer, which issues commands to the library. The library may conventionally be arranged to retrieve and store data for a variety of hosts, often connected to the library over the same network. The host typically commands the library to retrieve a selected data storage media and deliver the data storage media to a data storage drive of the library.

The drive units may be directly interconnected with the host(s) over host/drive interfaces and, after a data storage media is delivered to a drive unit, it typically searches for, and reads selected data from or writes data to the selected data storage media in response to commands from the host. Each drive unit typically includes a drive and a controller for operating the drive. One example of a drive unit arrangement employing a single controller for operating a plurality of magnetic tape cartridge drives is the IBM 3590 Model A50 Data Storage Subsystem.

A number of different companies manufacture automated data storage libraries today, each model displaying various different features. One example is the IBM 3494 Data Storage Library, which stores magnetic tape cartridges, and employs IBM 3590 Data Storage Drives.

The incorporated Basham et al. U.S. patent application describes a method for formatting data storage cartridges to various capacities, called flexible capacity scaling, as employed, for example, with an IBM 3590 Data Storage Drive and IBM 3590 magnetic tape data storage media. Basham et al. describes the tape as a multi-track linear data storage media, which may have data blocks recorded in bi-directional serpentine patterns. Fixed capacity scaling, rather than storing the data blocks on several tracks or track groups sweeping the entire length of the tape, is the congregation of the data on all tracks of the tape near the beginning of the tape. Flexible capacity scaling stores the data blocks on a multi-track tape using a hybrid serpentine pattern, comprising separate sets of serpentine patterns along the length of the tape. Flexible capacity scaling is defined as the arrangement of the data blocks in a continuous configuration of multiple adjacent stacked serpentine patterns. The configuration is continuous in that sequential access to all data blocks is possible without advancing the tape to skip over any regions intervening between adjacent ones of the ordered data blocks.

As described in Basham et al., the fixed capacity scaling or the flexible capacity scaling of a tape is accomplished by the drive controller operating the drive to pre-format a tape, and is invisible to the host. By congregating the data blocks near the beginning of tape, tape head movement is advantageously restricted to only part of the tape and time consuming tape advancement operations are avoided in favor of small, relatively rapid operations to "vertically" align the tape head and data path and then indexing the tape head or switching to a different tape head.

In order to implement the above tape pre-formatting, the host must be programmed to command the drive to conduct preformatting of the tape.

Automated data storage libraries, however, as described above, operate with a variety of host processors, some of which may have different operating systems-and application programs. For example, host processors may comprise an IBM personal computer, IBM model RISK System/6000 computer, IBM model AS/400 Advanced Systems computer, Sun workstation, HP workstation, IBM 3090 mainframe computer, or other suitable data processing apparatus. Thus, each of the different hosts may have to be provided with a special program in order to be enabled to command the drive to conduct pre-formatting of the tape.

Further, ones of the variety of hosts may have programming to communicate with data storage drives having differing interfaces, such as an IBM 3490-type of interface, an IBM 3490X-type of interface, an IBM 3590-type of interface, or an IBM 3590X-type of interface. The drive controller for the data storage drive of the IBM 3590 Model A50 Data Storage Subsystem has the capability to communicate in the protocol of ones of such a plurality of interfaces, and may be switched in an initialization process. However, in an automated data storage library, it may not be possible to dedicate a data storage drive to a single host.

SUMMARY OF THE INVENTION

It is an object of the present invention to allow capacity scaling of data storage media stored in an automated data storage library.

It is another object of the present invention to allow host/drive communication by data storage drives in an automated data storage library with differing interfaces.

Disclosed is an automated data storage library for storing and retrieving data storage media in a plurality of storage slots, for a host processor, the host processor signaling the automated data storage library to retrieve a selected data storage media. At least one drive unit is coupled to the host processor for reading and/or writing data on the data storage media, and at least one robotic accessor transports the data storage media between the storage slots and the at least one drive unit. A library manager is coupled to the host processor, to the at least one drive unit and to the at least one robotic accessor. The library manager includes a stored table for identifying the data storage media stored in the storage slots, the stored table indicating artificial scaling the data storage capacity of selected data storage media to selected values less than the actual data storage capacity thereof. The library manager responds to the retrieve signal from the host processor, signaling an accessor to transport the selected data storage media to a drive unit, and signaling the drive unit to artificially scale the data storage capacity of the selected the data storage media to the selected value therefor identified in the stored table. In accordance with a more specific aspect of the present invention, the library manager signals the drive unit to detect the presence of the artificially scaled data storage capacity format at the selected data storage media, and if the artificially scaled data storage capacity format is absent, to format the selected data storage media to the artificially scaled data storage capacity.

In accordance with another aspect of the present invention, the library manager of the automated data storage library is coupled to the host and receives commands from the host designating certain ones of the data storage media as having the artificially scaled capacity. The library manager responds thereto by providing the artificial scaling indicator for the designated ones of the data storage media in the stored table.

In accordance with still another aspect of the present invention, at least one drive unit of the automated data storage library is coupled to a host at a drive/host interface for reading and/or writing data on the data storage media.

The library manager is coupled to the at least one host, coupled to the at least one drive unit, coupled to the at least one robotic accessor, and has a stored table. The library manager stores, in the stored table, indicators of attributes of the automated data storage library with respect to ones of the data storage media. In response to the retrieve signal from the host, the library manager signals the accessor to transport the selected data storage media to a drive unit, and signals the drive unit to operate in accordance with the attributes from the stored table for the selected data storage media, such as signaling the drive unit to communicate at the drive/host interface in the protocol of the attributes indicated for the selected data storage media in the stored table.

For a fuller understanding of the present invention, reference should be made to the following detailed description taken in conjunction with the accompanying drawings.

DETAILED DESCRIPTION OF THE INVENTION

This invention is described in preferred embodiments in the following description with reference to the Figures, in which like numbers represent the same or similar elements. While this invention is described in terms of the best mode for achieving this invention's objectives, it will be appreciated by those skilled in the art that variations may be accomplished in view of these teachings without deviating from the spirit or scope of the invention.

Figure 1:
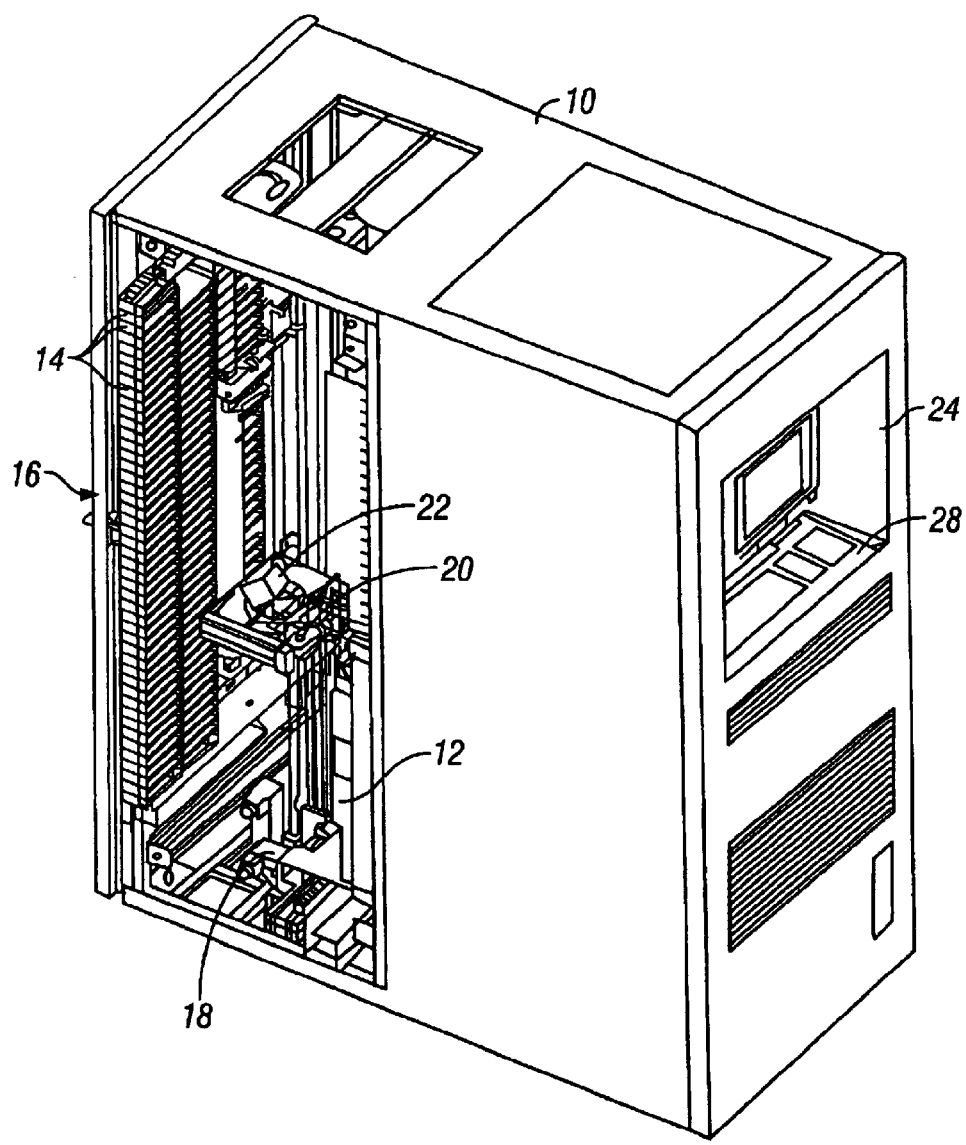
FIG. 1 is an isometric view of an automated data storage library in accordance with an embodiment of the present invention.
Figures 2, 3:
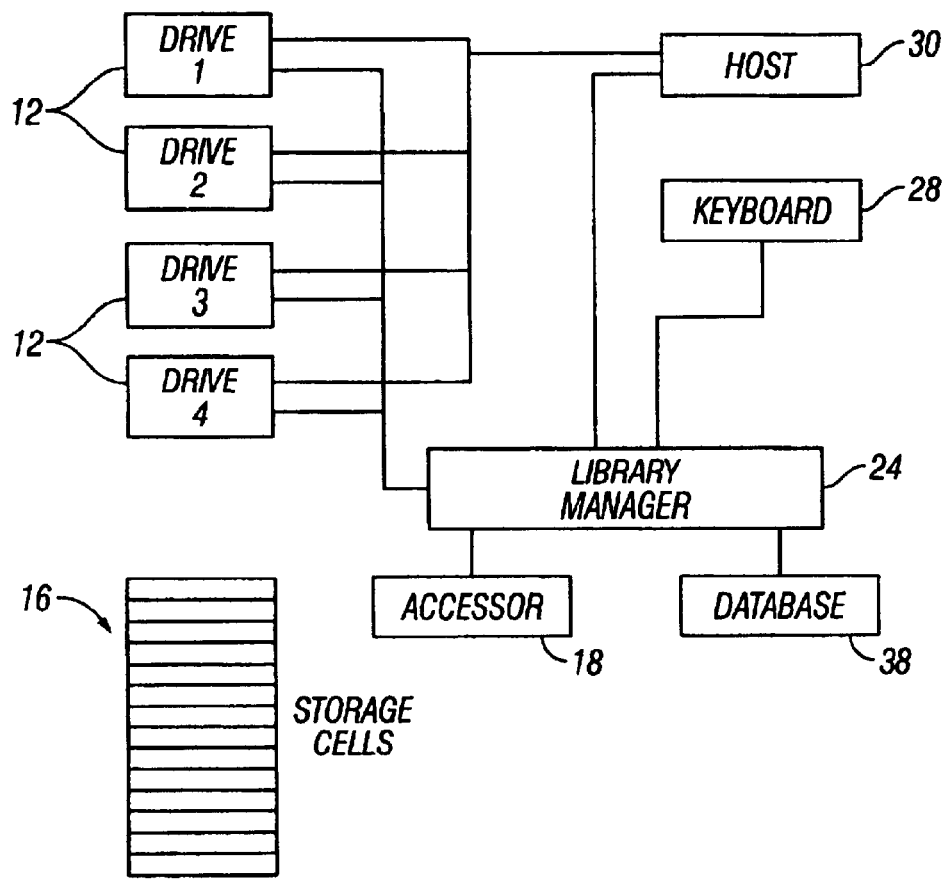
FIG. 2 is a block diagram of the automated data storage library of FIG. 1.
FIG. 3 is a diagrammatic representation of a stored table (cartridge table) of a library manager of FIGS. 1 and 2.

FIG. 1 is an isometric view, and FIG. 2 is a block diagram, of an automated data storage library 10 for storing and accessing data storage media. The library 10 includes one or more drive units 12, media cartridges 14 stored in storage slots 16, an accessor 18, and a library manager 24. The accessor 18 transports a selected cartridge 14 between a storage slot 16 and a drive 12. The accessor 18 includes a cartridge gripper 20 and a bar code scanner 22, or similar vision system, mounted on the gripper 20, to "read" identifying cartridge labels. The drives 12 can be optical disk drives or magnetic tape drives and the cartridges can contain optical or magnetic media, respectively, or any other removable media and associated drives. The capacity scaling aspect of the present invention is employed to greatest advantage if the media is a linear media, such as magnetic tape, as will be explained.

The library manager 24, which includes at least one computing processor, is interconnected with, and controls the actions of, the drives 12 (through their associated controllers) and the accessor 18. The library manager is also provided with a keyboard 28 and is interconnected through a provided interface to one or more host processors 30. Data access commands and information to be recorded on, or to be read from, selected cartridges 14 are transmitted directly between the drives 12 and the host. Library manager 24 is provided with a database 38, which includes storage (typically one or more hard disk drives) for tables and programs.

User data is typically stored and retrieved from the library using an application program, for example, the ADSM program of the IBM Corporation. Such application programs typically issue retrieval and storage commands to the library and issue search, read and write commands to the data storage drive. These commands are typically generic and the various libraries and data storage drives are designed to be compatible with the generic commands.

Computer data to be stored on removable media, such as magnetic tape, is typically arranged in data volume units that originally corresponded to one data storage media, such as a reel of tape or tape cartridge or cassette. The capacity of such data storage media has grown substantially in recent years. Thus, the average size of data sets in most computer or data processing centers is significantly less than the capacity of the data storage media volumes. Most programming support for peripheral data storage is directed at only the original volume units and does not provide a general solution to storing multiple data sets in the same volume. Consequently, the potential capacity of removable data storage volumes was not realized because a single small data set was stored in one volume, leaving the remainder of the volume unused.

A recent development for better utilizing the full capacity of a removable media cartridge (also called a media volume or a physical volume) is to store multiple volumes (called virtual or logical volumes) on a single physical volume. Data which would have been stored in multiple, mostly unused physical volumes are collected and stored on a single physical volume in separately addressable, host-processor defined logical data storage volumes. The incorporated '557 patent describes the creation and management of such logical volumes and the associated physical volumes in an automated virtual storage and retrieval library. As the result, the host processor treats only logical volumes as though they were separate physical media volumes, and the library manages the access to the logical volumes by accessing the associated physical volumes. A subsystem providing automatic management of tape data storage having such logical volumes is called a Virtual Tape Server. The '557 patent describes the establishment of a stored table of logical volume records and of physical volume records for managing the data storage. In the embodiment of FIGS. 1 and 2, the stored table is stored in database 38.

A helpful tool in managing the massive numbers of logical volumes that can be stored in such libraries is the concept of "Categories". As described in the '557 patent, a category may be defined for data storage volumes having a common attribute. Some common attributes include scratch volumes, expiration dates, common user, type of volume, host-processor data related to a job or set of jobs, volumes to be transferred or migrated to a scratch category, etc. A set of logical volumes may be selected for use by calling for a category, which will select any volume in the category. One example is mounting one volume from a scratch category on a drive of the library.

Presently, the average number of logical volumes contained in a single physical volume is approximately 50. The number of cartridges in a typical tape library is 1,000, with the result that a typical Virtual Tape Server tape library, such as the IBM 3494, contains 50,000 logical volumes. A library initially containing empty cartridges will gradually add data and fill the physical volumes with logical volumes as described in the '557 patent. In addition, some cartridges will be taken offline, out of the library and placed in shelf storage, and be replaced by new cartridges. Also, some data will be replaced or reorganized such that cartridges will become available for reuse as though new.

Management of the data storage table for tracking the logical and physical volumes is accomplished by the Virtual Tape Server, which may be incorporated in the library manager 24 and the database 38.

As stated above, it is an object of the present invention to allow capacity scaling of data storage media stored in an automated data storage library.

It is another object of the present invention to allow host/drive communication by data storage drives in an automated data storage library with differing interfaces.

In accordance with the present invention, and referring additionally to FIG. 3, the library manager 24 includes a stored table 40 in database 38 and provides data regarding the status of all the volumes in the library, logical and physical. One line of the cartridge table as illustrated represents one volume. The first column 41 in the table is the VOLSER as described above.

The second column 42 is the category of the volume. As described above, the host may assign volumes into logical groups called "categories". Some common attributes for the logical groups include scratch volumes, expiration dates, common user, type of volume, host-processor data related to a job or set of jobs, volumes to be transferred or migrated to a scratch category, etc.

The "CELLXY" column 43 is the coordinates of the cell 16 where the cartridge is stored at the present time.

The "HOMEXY" column 44 is the coordinates of the "home cell" for this VOLSER. All logical volumes are assigned the same HOMEXY. If the library is in fixed home cell mode, the physical volume HOMEXY is not changed during library manager operation. In floating home cell mode, the HOMEXY is updated every time the cartridge is swapped at a storage slot. During a swap, the HOMEXY of the two cartridges involved in the swap are swapped. This ensures that every cartridge has a unique homexy.

The next column 45, "MOUNTS", comprises the number of times this VOLSER has been mounted. It is incremented when a mount completes successfully.

The "MEDIA TYPE" column 46 indicates whether a VOLSER is a logical volume or a physical volume. MEDIA TYPE may also indicate the type of physical volume in the type of library in which a plurality of types of cartridges can be stored in the library. Examples of different types of cartridges includes regular volumes, volumes with thin tape and greater capacity, etc.

The next column 47 illustrated is "INDICATORS" which may be special identifiers arising during operation of the library. Examples include "misplaced" to identify that a volume could not be located; "unreadable" is used to identify that the VOLSER on the label is not readable by the vision system; "mounted" indicates that a command has been issued to mount the volume in a drive 12 and is reset only after a command is issued to demount the cartridge and transport the cartridge to a cell; "manual mode" indicates that the cartridge may have been handled by the operator and is reset only after the cartridge label has been read by the vision system; and "eject pending" indicates that the volume has been selected for ejection from the library, either singly or as part of a bulk ejection.

In accordance with an embodiment of the present invention, capacity scaling of the media is indicated in column 48, "CARTSIZE", or cartridge size. The maximum capacity of a cartridge may, for example, be 10 gigabytes, such as indicated in column 48 by indicator "10" for cartridge "KIM002". To indicate artificial scaling of the data storage capacity of a selected data storage media to a selected value less than the actual data storage capacity thereof, the indicator in column 48 is set to an artificial capacity or size. For example, the indicator in column 48 for cartridge "KIM001" is set to "5", designating, for example, 5 gigabytes or half a full capacity cartridge, and the indicator in column 48 for cartridge "RAY999" is set to "1", designating, for example, 1 gigabyte or ten percent of a full capacity cartridge.

A drive controller, such as described in the incorporated Basham et al. U.S. patent application, will respond to a command from the library manager 24 to format the tape to artificially scale the capacity of the cartridge to the indicated capacity.

In accordance with another aspect of the present invention, the library manager stores, in column 49 of the stored table, indicators of attributes of the automated data storage library with respect to ones of the data storage media. An exemplary attribute may comprise the interface protocol "INTFTYPE" for the host system which is associated with the data storage media. For example, the media identified as "KIM001" may be associated with a host 30 requiring that the drive 12 communicate as though it were an older "3490" tape drive. Examples of interfaces are described above. The drive controller for the data storage drive of the IBM 3590 Model A50 Data Storage Subsystem has the capability to communicate in the protocol of ones of such a plurality of interfaces, and may be switched in an initialization process under the command of the library manager 24. Specifically, code for both protocols are loaded and a reinitialization is required to switch between interface protocols.

Figure 4:
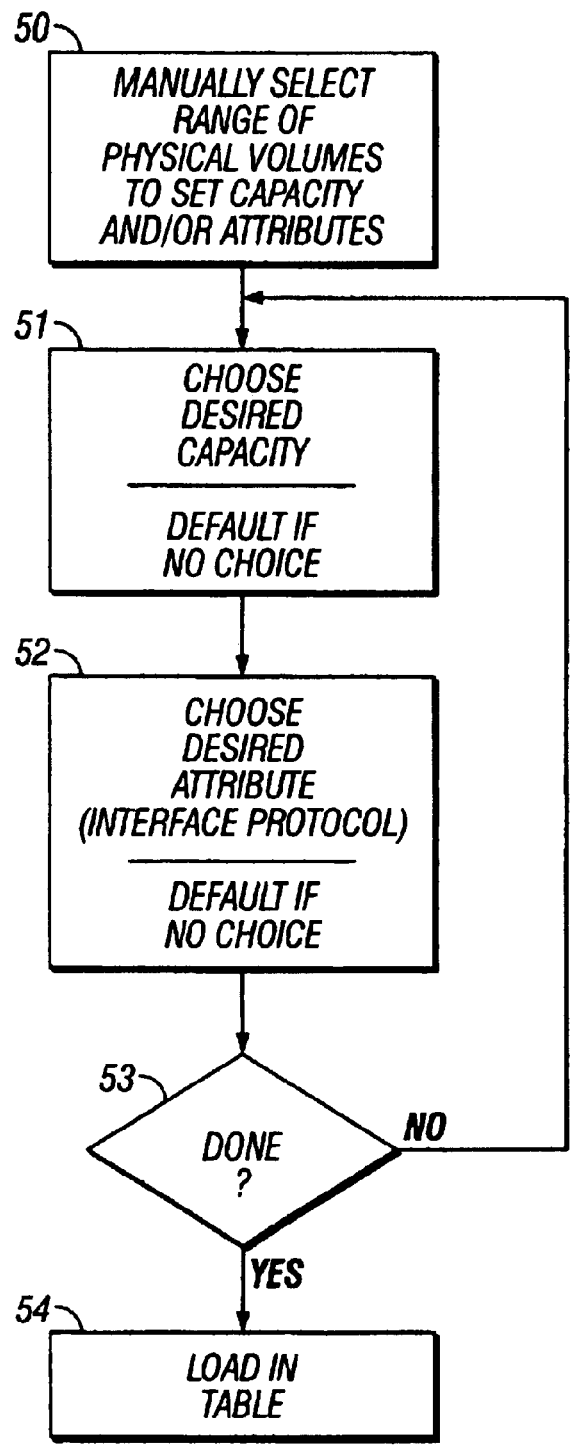
FIGS. 4 and 5 are flow charts depicting embodiments of the methods of the present invention.

Referring to FIGS. 4 and 2, entries in the stored table 40 may be established singly or in groups manually at keyboard 28 or through a host 30, or automatically by an inventory process. For example, as described in the incorporated '557 patent, the stored table 40 may be produced by selecting a range of cartridges by, for example, VOLSER, or by category, etc. In FIG. 4, this selection is shown as step 50 and the cartridges are defined as "physical volumes", for which it is desired to set the capacities and/or attributes. A single cartridge is considered the minimum range. In step 51, the desired capacity for the range of physical volumes is set, and, if not-manually selected, a programmed default is set.

In step 52, the desired attribute, such as interface protocol, for the range of physical volumes is set. Again, if the interface is not manually selected, a programmed default is set.

In step 53, the operator is given an opportunity to review the choices and may indicate whether the entry process is "DONE", and, if not, to repeat the process. If the operator indicates that the entry of the capacity and attribute for the range of physical volumes has been completed, step 54 loads the entries in the stored table 40. Of course, the entries may include categories, media type or indicators, if not already entered. Thus, although only single entries in the illustrated stored table 40 are shown with the same cartridge sizes and interface type, it is often advantageous to have a sequential group of cartridges with the same artificial capacities and attributes. Further, it is often advantageous to group the cartridges in sequentially adjacent storage slots for sequential use in a drive by a single host, for high efficiency retrieval and storage in the library storage slots.

For efficient operation of the library, not all entries in the stored table 40 of FIG. 3 are implemented at the same time.

For example, it would be disastrous to library performance to stop normal retrieval operations of the library in order to preformat or reformat all of the cartridges to the desired capacities.

Figure 5:
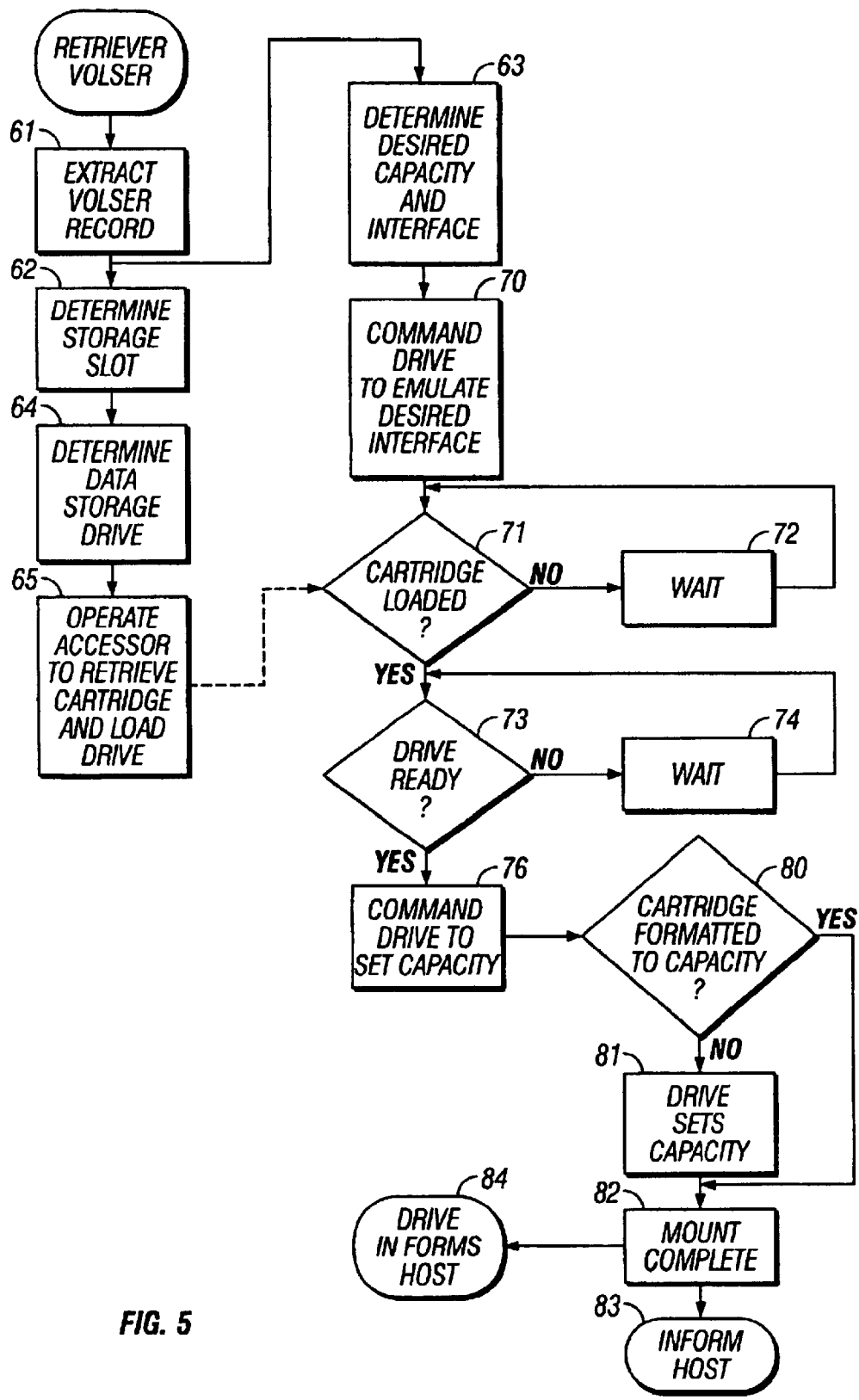

Rather, as shown in FIG. 5, the library manager responds to the retrieve signal from the-host processor at step 60, signaling an accessor to transport the selected data storage media to a drive unit, and signaling the drive unit to artificially scale the data storage capacity of the selected the data storage media to the selected value therefor identified in the stored table, and then signaling the drive unit to operate in accordance with the attributes from the stored table for the selected data storage media, such as signaling the drive unit to communicate at the drive/host interface in the protocol of the attributes of the selected data storage media in the stored table.

Specifically, in step 61, the VOLSER record for a desired cartridge is extracted (read) from the stored table 40 in FIG. 3. It is more efficient to both operate the accessor and set up the drive controller simultaneously, rather than sequentially. Thus, from the VOLSER record for the cartridge, both step 62 and step 63 may be initiated at about the same time. In step 62, the "CELLXY" entry of table 40 identifies the location of the storage slot for the cartridge. In step 63, the desired capacity of the cartridge is determined from the "CARTSIZE" entry and the desired interface protocol for the cartridge is determined from the "INTFTYPE" entry of the table 40 for the cartridge.

At about the same time (unordered steps) that step 62 determines the storage slot location from which the cartridge is to be retrieved, step 64 determines (from the host) the data storage drive to which the cartridge is to be delivered and loaded. The accessor is then operated in step 65 to retrieve the cartridge from the identified storage slot and to load the cartridge in the identified data storage drive. Alternatively, the storage slot location may first be identified in step 62 and then step 65 is initiated to move the accessor to the proper storage slot. Then, step 64 may be conducted to determine the location of the data storage drive to subsequently deliver the cartridge.

While the accessor is operating, step 70 employs the interface identification of step 63 to command the drive controller of the desired drive unit to emulate the desired interface. The drive controller may then conduct the needed reinitialization of the drive to provide the desired interface protocol. Steps 71 and 72 wait for completion of the retrieval and loading process by the accessor of step 65. Steps 73 and 74 wait for completion of the interface initialization of step 70.

In step 76, the cartridge has been loaded into the drive unit, and the drive is commanded to set the capacity of the cartridge. In step 80, the present capacity format of the cartridge is determined by the data storage drive, which may be by reading a header of the cartridge. If the cartridge has not been formatted to the capacity designated in step 76, the drive formats the cartridge to that designated capacity in step 81. (The steps indicated by the single outline are conducted by the library manager 24 of FIG. 2, and the steps indicated by the double outline are conducted by the data storage drive.) If the cartridge has been previously formatted to the capacity designated in step 76, step 81 is skipped, and, in either case, the mount of the cartridge at the drive is complete as illustrated by step 82. At about the same time, the library manager informs the host that the retrieval and mount of the cartridge are complete in step 83, and the drive informs the host in step 84 that the cartridge is loaded and is ready for reading or writing thereon by the host.

Alternative sequences of steps and alternative attributes of the library components may be envisioned by those of skill in the art.

While the preferred embodiments of the present invention have been illustrated in detail, it should be apparent that modifications and adaptations to those embodiments may occur to one skilled in the art without departing from the scope of the present invention as set forth in the following claims.

We claim:

1. An automated data storage library for storing and retrieving data storage media for a host processor, said host processor signaling said automated data storage library to retrieve a selected data storage media, comprising:

a plurality of storage slots for storing said data storage media;

at least one drive unit coupled to said host processor for reading and/or writing data on said data storage media;

at least one robotic accessor for transporting said data storage media between said storage slots and said at least one drive unit; and a library manager coupled to said host processor, to said at least one drive unit and to said at least one robotic accessor, said library manager having a stored table for identifying said data storage media stored in said storage slots, said stored table indicating attributes of said automated data storage library with respect to said data storage media, and said library manager responding to said retrieve signal from said host processor, signaling a said accessor to transport said selected data storage media to a said drive unit, and signaling said drive unit to operate in accordance with said attributes with respect to said selected said data storage media.

2. The automated data storage library of claim 1, wherein said attributes stored in said table comprises drive/host interface modes with respect to said data storage media, and wherein said library manager signals said drive unit to communicate at said drive/host interface in protocol of said attributes of said selected data storage media in said stored table.

3. In an automated data storage library for storing data storage media in and retrieving data storage media from storage slots, said automated data storage library coupled to at least one host, said host signaling said automated data storage library to retrieve a selected data storage media, said automated data storage library having at least one drive unit coupled to said host at a drive/host interface for reading and/or writing data on said data storage media, at least one robotic accessor for transporting said data storage media between said storage slots and said at least one drive unit, and a library manager coupled to said at least one host, coupled to said at least one drive unit, coupled to said at least one robotic accessor, and having a stored table, a method for operating said automated data storage library, said host comprising the steps of:

storing, in said stored-table, indicators of attributes of said automated data storage library with respect to ones of said data storage media;

signaling, in response to said retrieve signal from said host, said accessor to transport said selected data storage media to a said drive unit; and signaling said drive unit to operate in accordance with said attributes from said stored table for said selected data storage media.

4. The method of claim 3, wherein said storing step comprises drive/host interface modes with respect to said data storage media, and wherein said signaling said drive unit comprises signaling said drive unit to communicate at said drive/host interface in protocol of said attributes of said selected data storage media in said stored table.

5. The method of claim 4, wherein said host designates at least a certain one of said data storage media as having said attribute indicators, additionally comprising the initial step of:

providing, in response to said host designation, said attribute indicators for said designated at least one of said data storage media in said stored table.

* * * * *